United States Patent
Bronowski

(10) Patent No.: US 10,427,309 B2
(45) Date of Patent: *Oct. 1, 2019

(54) MULTI-STAGE GRIPPER

(71) Applicant: Marek Bronowski, Warsaw (PL)

(72) Inventor: Marek Bronowski, Warsaw (PL)

(*) Notice: Subject to any disclaimer, the term of this patent is extended or adjusted under 35 U.S.C. 154(b) by 0 days.

This patent is subject to a terminal disclaimer.

(21) Appl. No.: 16/112,644

(22) Filed: Aug. 25, 2018

(65) Prior Publication Data

US 2019/0126496 A1    May 2, 2019

Related U.S. Application Data

(63) Continuation-in-part of application No. 15/808,894, filed on Nov. 10, 2017, now Pat. No. 10,059,009.

(30) Foreign Application Priority Data

Oct. 27, 2017    (PL) ..................................... 126741 U

(51) Int. Cl.
| | |
|---|---|
| *B25J 15/06* | (2006.01) |
| *B25J 9/10* | (2006.01) |
| *B25J 9/14* | (2006.01) |
| *B25J 18/02* | (2006.01) |

(52) U.S. Cl.
CPC ......... *B25J 15/0625* (2013.01); *B25J 9/1055* (2013.01); *B25J 9/142* (2013.01); *B25J 15/0633* (2013.01); *B25J 18/025* (2013.01)

(58) Field of Classification Search
CPC .............. B25J 15/0616; B25J 15/0625; B25J 15/0633; B25J 15/0641; B25J 9/1055; B25J 18/025; B66C 1/02; B66C 1/0256; B66C 1/0275; B66C 1/0293; G07F 9/105; G07F 11/165; G07F 17/0071
USPC .................. 294/183, 185, 186, 187; 414/627
See application file for complete search history.

(56) References Cited

U.S. PATENT DOCUMENTS

| | | | | | |
|---|---|---|---|---|---|
| 4,858,976 | A | * | 8/1989 | Stoll | ...................... B25B 11/005 294/186 |
| 5,051,055 | A | * | 9/1991 | Blatt | ........................ B25J 18/02 414/626 |
| 5,240,139 | A | * | 8/1993 | Chirnomas | .............. A23G 9/28 221/123 |

(Continued)

FOREIGN PATENT DOCUMENTS

EP         2871617 A1 *   5/2015   .............. G07F 9/10

*Primary Examiner* — Dean J Kramer
(74) *Attorney, Agent, or Firm* — Andrew Malarz, Esq.

(57) ABSTRACT

The multi-element pneumatic gripper equipped with a pump which enables attaching the products by a suction cup, is characterized by the fact that the gripper of a multi-element pneumatic telescopic actuator which ends on one side with a sucker with a weight and a steel ball inside the weight and on the other side is connected to the supply system, whereas an electromechanical uptake is located at the base of the first element of the pneumatic telescopic actuator, wherein in the first embodiment the supply system consists of a vacuum/pressure pump, suction and discharge lines, a valve which supplies air to the system, a three-way valve and a pressure sensor, and wherein in the second embodiment the supply system consists of a vacuum/pressure pump, a suction line, a valve which supplies air to the system and a pressure sensor.

3 Claims, 2 Drawing Sheets

(56) References Cited

U.S. PATENT DOCUMENTS

| | | | | |
|---|---|---|---|---|
| 5,374,091 A * | 12/1994 | Gore | ............... | B25J 15/0616 |
| | | | | 294/183 |
| 6,039,530 A * | 3/2000 | Schmalz | ............ | B25J 15/0616 |
| | | | | 271/103 |
| 6,270,135 B1 * | 8/2001 | Boyd | ............... | B25J 15/0616 |
| | | | | 294/185 |
| 8,079,494 B2 * | 12/2011 | Ubidia | ............. | B25J 9/041 |
| | | | | 221/123 |
| 8,121,727 B2 * | 2/2012 | Mosey | ............... | G07F 9/105 |
| | | | | 221/131 |
| 10,059,009 B1 * | 8/2018 | Bronowski | ......... | B25J 15/0625 |
| 2003/0146233 A1 * | 8/2003 | Chirnomas | .......... | G07F 11/02 |
| | | | | 221/123 |
| 2004/0050852 A1 * | 3/2004 | Sloss | ............... | F25D 23/026 |
| | | | | 221/2 |

* cited by examiner

MULTI-STAGE GRIPPER

This application is a continuation-in-part of the patent application Ser. No. 15/808,894, filed on Nov. 10, 2017.

FIELD OF THE INVENTION

The subject of the utility model is a multi-element pneumatic gripper for use especially in vending machines for picking products from freezers, refrigerators or other storage bins, as well as for picking products stacked in layers, inter alia at assembly of small parts on a production belt, marking of products, quality control and in medicine and/or pharmacy for picking and dispensing products stored at low temperatures or in sterile environment.

BACKGROUND

In vending machines, especially for frozen products, the main elements that draw the attention of the constructors of these machines are the solutions of grippers that pick the product from the refrigeration chamber.

In the prior art, both mechanical grippers and pneumatic grippers are known. Mechanical ones are described inter alia in the patent application EP2871617 relating to a vending machine for frozen products. In that vending machine, the product gripper is composed of four serrated arms mounted in the head, which, thanks to the serrated arms, snap into the lid on the box by the lowering action. Although this solution is very practical for frozen products packed in plastic boxes with a lid, it can not unfortunately be used for other types of packaging.

For products with less regular shape or for products packed in a different way than a box with a cover, solutions are sought which include vacuum/pneumatic suction devices allowing vacuum extraction of products from e.g. fridges or freezers.

Among others, the U.S. Patent Application No. 2004/0050852 discloses a vending machine for Fastcorp products, which employs vacuum grippers. The principle of operation of this solution is that once the product selection signal is received, an electric actuator opens the freezer compartment lid to the upright position and a carriage with the gripper moves and takes a position over the selected product. A suction pump is started and lowered on a supply line ended with a suction cup. When the product is touched, a pressure sensor causes the pump to rise with the product and the carriage travels out of the cooling chamber to the supply trough—in the position above the supply trough. Then the suction pump is switched off, the solenoid valve which removes vacuum is opened, the product falls into the supply trough and the electric actuator closes the lid of the refrigerating chamber.

The disadvantage of this solution is the large size pump lowered onto the supply line to the inside of the product chamber. The pump diameter of approx. 65 mm requires chambers of a similar cross-section and prevents picking up products of small dimensions.

SUMMARY

The multi-element pneumatic gripper as per the utility model, equipped with a pump which enables attaching the products by a suction cup, is characterized by the fact that it consists of a multi-element pneumatic telescopic actuator which ends on one side with a sucker with a weight and a steel ball inside it and on the other side is connected to the supply system, whereas an electromechanical uptake is located at the base of the first element of the pneumatic telescopic actuator.

In the first variant of the utility model, the supply system consists of a vacuum/pressure pump, suction and discharge lines, a valve which supplies air to the system, a three-way valve and a pressure sensor.

In the second variant of the utility model, the supply system consists of a vacuum/pressure pump, a suction line, a valve which supplies air to the system and a pressure sensor.

BRIEF DESCRIPTION OF THE DRAWINGS

The object of the utility model is presented in the drawing, where.

DETAILED DESCRIPTION OF THE DRAWINGS

Figure 1:
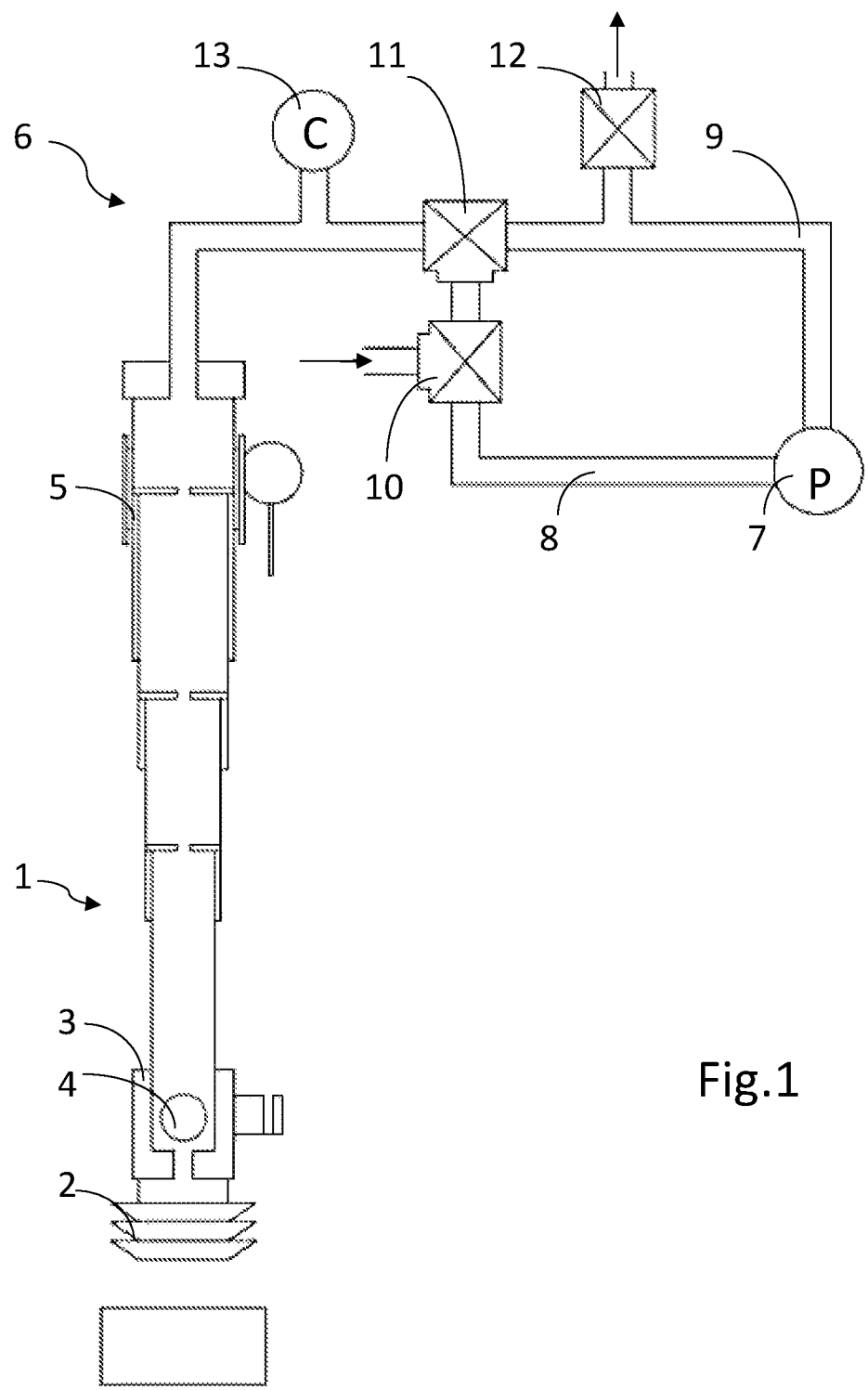
FIG. 1 shows a schema of the pneumatic gripper with a supply system in the first embodiment of the invention.

As shown in FIG. 1, the multi-element pneumatic gripper consists of a 4-member pneumatic telescopic actuator 1, terminated on one side by a suction cup 2 along with a weight 3 and a steel ball 4 inside it having a diameter which is smaller than the inside diameter of the fourth lower member, which is free to move along the entire length of the member. At the end of the first upper member of the pneumatic actuator 1 there is the electromechanical uptake 5.

On the other side, the gripper is connected with a supply system 6 consisting of a vacuum/pressure pump 7, a suction line 8, a discharge line 9, a three-way valve 10 on the suction line 8, a three-way valve 11 on the discharge line 9, a shutoff valve 12 (used as a vent) and a pressure sensor 13.

Figure 2:
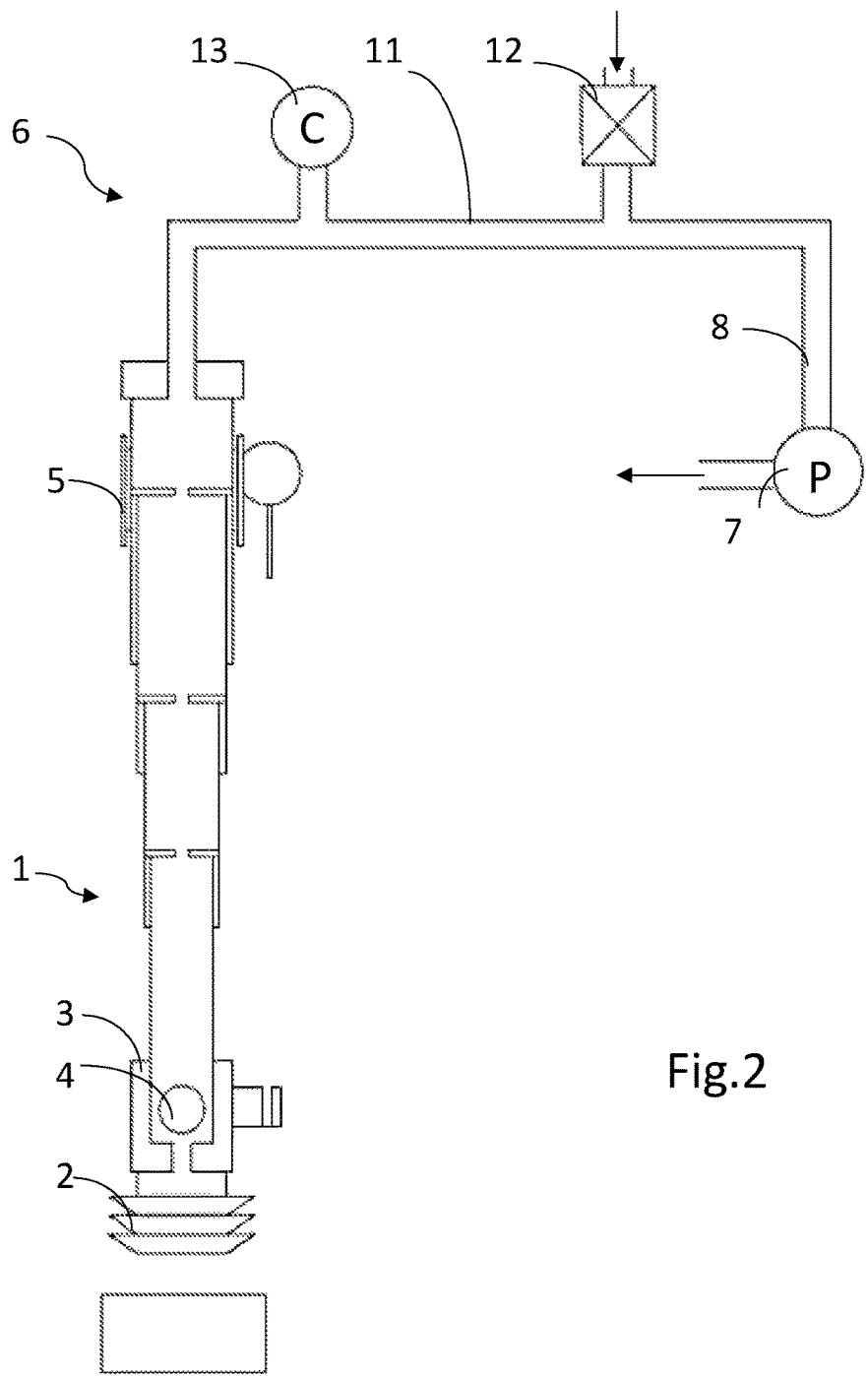
FIG. 2 shows a schema of the pneumatic gripper with a supply system in the second embodiment of the invention.

In the second embodiment of the invention shown in FIG. 2, the supply system 6 consists of a vacuum/pressure pump 7, a suction line 8, a shutoff valve 12 on the suction line 8 (used as a vent) and a pressure sensor 13.

The gripper is mounted on the vending machine gripper carriage, not shown in the drawing, which enables the gripper movement in the horizontal plane.

The principle of operation of the multi-element pneumatic gripper according to the utility model is as follows.

As shown in FIG. 1, when the gripper is in the starting position, the elements of the telescopic pneumatic cylinder 1 are retracted and the suction cup 2 is in the seat of the electromechanical pickup 5. When the electromechanical pickup 5 is released, the vacuum/pressure pump 7 is feeding air under pressure to the telescopic actuator 1, which causes the telescopic cylinder 1 to extend until the suction cup 2 contacts the product being collected (e.g. an ice container). As a result of contact of nozzle 2 with the product, there is an air pressure increase in the supply system 6 and the pressure sensor 13 causes the three-way valve 11 to switch over to suction. The suction cup 2 attaches to the product, the telescopic actuator 1 collapses so that the suction nozzle 2 with the product moves upward and slides into the electromechanical pick-up 5. The sliding suction cup 2 opens the pickup jaws 5 which close behind it and blocks its movement downwards. Then the telescopic actuator 1 is moved with the machine's carriage to the vending machine supply point. At this moment, the vacuum/pressure pump 7 is switched off, valve 10 is opened on the suction line 8 and the product drops off from the nozzle 2 and falls into the feed chamber of the machine. Then the carriage returns to its original position.

In the second grip variant, shown in FIG. 2, the telescopic actuator moves downward under its own weight (gravity) after releasing pickup 6. When the product is touched by the suction nozzle 2, the shutoff valve 12 on the suction line 8 is closed causing the vacuum/pressure pump 7 to actuate and thereby the telescopic cylinder 1 with the product moves upwards. The sliding suction cup 2 opens the jaws of the electromechanical pickup 5 which close behind it and block its movement downwards. Then the telescopic actuator 1 is moved with the machine's carriage to the vending machine supply point. At this moment, the vacuum/pressure pump 7 is switched off, the shutoff valve 12 on the suction line 8 is opened and the product drops off the suction cup 2 and falls into the supply chamber of the machine. Then the carriage returns to its original position.

The solution as in the invention also makes it possible to provide protection in the absence of products to be collected or inability to pick up the product (e.g. an upturned product container), which is such that when the suction cup 2 touches the product but there is no pressure increase in the supply system 6 within the set time limit (e.g. 5 seconds), the revolutions of the suction/pressure pump 7 increase thereby increasing the vacuum in the supply system 6. The increase closes the air flow in the extreme low element of the actuator as the steel ball 4 rises to the level of the port in the piston.

Then the telescopic actuator 1 folds and the suction cup 2 will go into the electromechanical pickup 5.

In the presented solution as per the utility model, a pneumatic telescopic actuator (1), consisting of four elements has been adopted as the most optimal one. However, application of an actuator with a different number of elements is not excluded in this solution.

The invention claimed is:

1. A multi-element pneumatic gripper, equipped with a pump which enables operation of a suction cup, characterized in that the gripper consists of a multi-element pneumatic telescopic actuator (1), terminated on one side with a suction cup (2) with a weight (3) with a steel ball (4) inside the weight, and on the other side connected to a supply system (6), where an electromechanical pickup (5) is located at a base of a first element of the telescopic pneumatic actuator 1.

2. The multi-element pneumatic gripper as per claim 1, characterized in that the supply system (6) consists of a vacuum/pressure pump (7), a suction line (8), a discharge line (9), a three-way valve (10) on the suction line (8), a three-way valve (11) on the discharge line (9), a shutoff valve (12) and a pressure sensor (13).

3. The multi-element pneumatic gripper as per claim 1, characterized in that the supply system (6) consists of a vacuum/pressure pump (7), a suction line (8), a discharge line (9), a shutoff valve (12) and a pressure sensor (13).

* * * * *